United States Patent [19]

Roess

[11] Patent Number: 4,906,512
[45] Date of Patent: Mar. 6, 1990

[54] ELECTRICAL MULTILAYER COMPONENT COMPRISING A SINTERED, MONOLITHIC CERAMIC BODY AND METHOD FOR ITS MANUFACTURE

[75] Inventor: Erich Roess, Unterhaching, Fed. Rep. of Germany

[73] Assignee: Siemens Aktiengesellschaft, Berlin and Munich, Fed. Rep. of Germany

[21] Appl. No.: 208,247

[22] Filed: Jun. 17, 1988

[30] Foreign Application Priority Data

Jul. 31, 1987 [DE] Fed. Rep. of Germany ....... 3725455

[51] Int. Cl.$^4$ .............................................. B32B 9/00
[52] U.S. Cl. .................................. 428/192; 428/210; 428/325; 428/328; 428/426; 428/432; 428/901; 428/208; 428/209; 428/433; 156/89; 361/321
[58] Field of Search ................ 156/89; 428/192, 210, 428/426, 432, 901, 325, 328, 208, 209, 433; 361/303, 321

[56] References Cited

U.S. PATENT DOCUMENTS

| | | |
|---|---|---|
| 3,679,950 | 7/1972 | Rutt ..................... 317/258 |
| 3,683,849 | 8/1972 | Atchley et al. ............ 118/50 |
| 3,965,552 | 6/1976 | Rutt ..................... 427/125 |
| 4,030,004 | 6/1977 | Rutt ..................... 428/136 |
| 4,071,880 | 1/1978 | Rutt ..................... 428/136 |
| 4,353,957 | 10/1982 | Rutt et al. ............... 428/136 |
| 4,526,129 | 7/1985 | Braden ................... 118/503 |
| 4,561,954 | 12/1985 | Scrantom et al. ........... 204/192 R |
| 4,658,328 | 4/1987 | Sakabe ................... 361/309 |
| 4,675,644 | 6/1987 | Ott et al. ................ 338/21 |

FOREIGN PATENT DOCUMENTS

| | | |
|---|---|---|
| 0189087 | 7/1986 | European Pat. Off. . |
| 2722140 | of 0000 | Fed. Rep. of Germany . |
| 3627936.6 | 5/1981 | Fed. Rep. of Germany . |
| 3638286 | 11/1982 | Fed. Rep. of Germany . |
| 3612084 | 10/1986 | Fed. Rep. of Germany . |
| 3627929.3 | 7/1987 | Fed. Rep. of Germany . |
| 932558 | 7/1963 | United Kingdom . |
| 2016714 | 4/1983 | United Kingdom . |
| 2162371 | 1/1986 | United Kingdom . |

*Primary Examiner*—Ellis P. Robinson
*Assistant Examiner*—P. J. Ryan

[57] ABSTRACT

An electrical multilayer component comprising a sintered monolithic body and a method for the manufacture of the component.

The sintered monolithic ceramic body of the electrical multilayer component includes cavities which alternate between layers, and are open toward end faces which are on opposite sides. The cavities also open toward lateral surfaces of the ceramic body over their entire lengths. The cavities contain ceramic particles which are distributed therethrough to act as supporting elements and are completely filled with a metal or metal alloy whose melting temperature is considerably lower than the sintering temperature of the ceramic body. The metal or alloy has the property of wetting the surfaces of the ceramic layers in the cavities in the molten condition. Contact elements are then applied to the end faces, the contact elements being impervious to the metal melt. Spaces free of metal are present in the cavities at the lateral surfaces of the ceramic body.

12 Claims, 3 Drawing Sheets

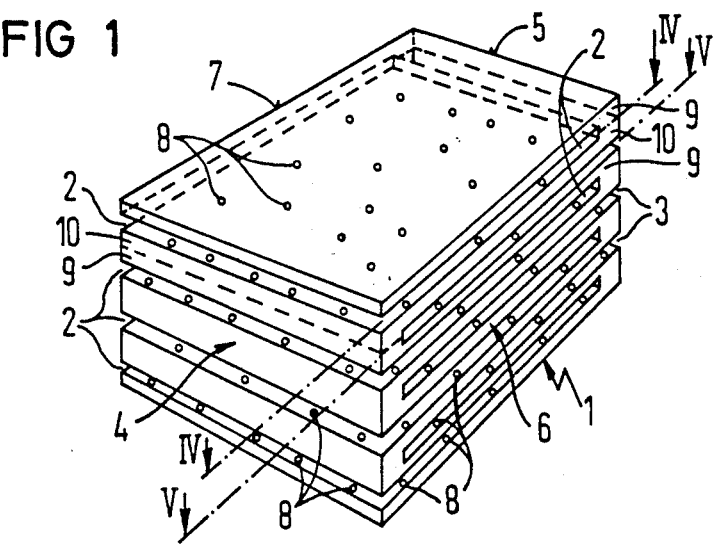
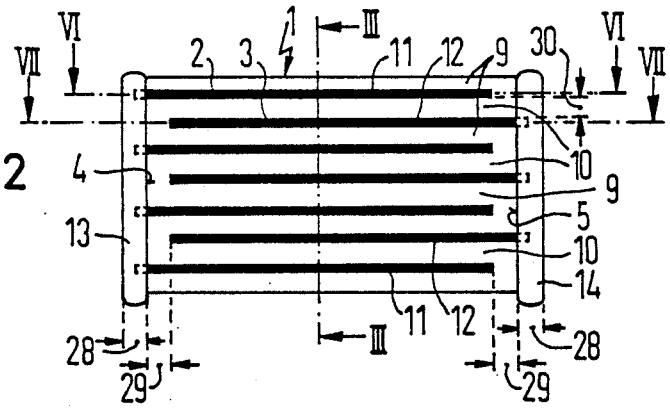
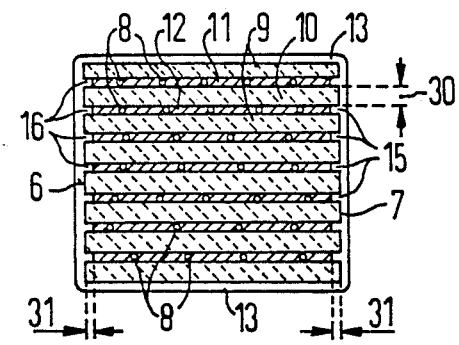

ELECTRICAL MULTILAYER COMPONENT COMPRISING A SINTERED, MONOLITHIC CERAMIC BODY AND METHOD FOR ITS MANUFACTURE

BACKGROUND OF THE INVENTION

1. Field of the Invention

The present invention is directed to an electrical multilayer component, particularly a capacitor, a PTC resistor or a varistor.

The multilayer component of the present invention includes a sintered, monolithic ceramic body having dielectric or semiconductive properties. Cavities are provided which alternate from layer to layer and are open alternately toward end faces which are opposed to each and are open to the adjacent lateral surfaces. Ceramic particles are distributed in the cavities, and serve to provide supporting elements in the cavities between the adjoining ceramic layers. The cavities are filled with a metal filler which is composed of a metal or alloy whose melting temperature is considerably lower than the temperature required for sintering of the ceramic body.

Contacts are applied at the end faces and may extend partially around on to the lateral faces, the contact members connecting the metal fillers to one another in electrically conductive fashion and being solderable, per se, or being provided with a coating which is solderable.

The invention also is directed to a method for the manufacture of such electrical multilayer components.

2. DESCRIPTION OF THE PRIOR ART

Electrical multilayer capacitors having a sintered, monolithic ceramic body of dielectric material of the type with which the present invention is concerned have been disclosed in the patent literature in many embodiments. Of this extensive patent literature, U.S. Pat. Nos. 3,679,950; 4,071,880; and 4,658,328 which corresponds to German published application No. 36 12 084 appear to be the most pertinent to the present invention.

U.S. Pat. No. 3,679,950 discloses a ceramic multilayer capacitor which provides a multilayer capacitor except that the cavities formed therein which alternate from layer to layer are open toward end faces which lie opposite to one another but are not open toward the adjacent lateral surfaces. This U.S. patent also discloses a method for the manufacture of such an electrical multilayer capacitor but employs cavities which are open only to one side. Since the plurality of layers made up in this way forms a stack which is practically closed on all sides, it is necessary to separate the stack into discrete members to permit escape and/or decomposition of the agents used for forming the cavities in a subsequent sintering process for which an appropriate heating, sintering and cooling program is required.

In addition to other possibilities, a metal having a low melting point or an alloy having a low melting point, for example, lead or an alloy composed of 50% Bi, 25% Pb, 12.5% Sn and 12.5% Cd have been suggested for the manufacture of the capacitor coatings inside the cavities of the monolithic ceramic body. All of these alloys have melting temperatures which are considerably lower than the sintering temperature of about 1325° C. required for sintering the monolithic ceramic body. These alloys do not wet the surface of the ceramic body, particularly in the cavities, or only wet it poorly.

With the multilayer capacitor disclosed in U.S. Pat. No. 3,679,950 the contact layers which are usually composed of silver are always applied to the end faces which lie opposite one another after the molten metal having a low melting point has been pressed in and after cooling of the saturated ceramic body.

U.S. Pat. No. 4,071,880 represents an improvement on U.S. Pat. No. 3,679,950 and is directed to an electrical multilayer capacitor comprising a sintered, monolithic body of the type described in the previously mentioned patent. U.S. Pat. No. 4,071,880 also discloses the possibility in detail of applying contact layers to the end faces of the monolithic ceramic body before its saturation, for which purpose the contact layers must be made porous.

The multilayer capacitor disclosed in U.S. Pat. No. 4,071,880 is composed of a plurality of ceramic layers and inside electrodes which lie on top of one another in alternating form and is also composed of outer double layer electrodes constituting contact layers which are connected to the inside electrodes in a predetermined fashion. For example, a comb-like electrode structure may be provided.

In the manufacture of such a monolithic multilayer capacitor, an untreated or unsintered ceramic material in the form of laminae is first produced by means of a stripping method using a stripper or scraper blade. These ceramic laminae have a thickness of about 0.05 to 0.1 mm. A carbonaceous paste is then applied or printed on to the surfaces of the ceramic laminae, the paste being composed of a mixture of a carbon powder and a ceramic powder. This paste is applied in limited regions such that the cavities in the finished ceramic body are alternately open only toward opposite end faces. A plurality of such printed ceramic laminae are arranged on top of one another in alternate form and are joined to one another for forming an integrated structure by applying pressure. Discrete bodies are produced from this integrated structure by cutting along cutting lines that extend perpendicularly relative to one another, the discrete bodies being sintered at a temperature above 1000° C. in order to sinter the ceramic laminae and in order to eliminate the carbon powder within the carbon paste which has been printed on. As a result, porous intermediate layers comprising ceramic powder are produced in regions in which the inside electrodes are to be formed. Following this, the porous outer electrodes or contact layers are applied to the sintered discrete bodies.

These structures can be produced, as well as structures of the present invention, utilizing methods that are disclosed in U.S. Pat. Nos. 3,683,849; 4,526,129; 4,561,954; British Patent No. 2 106 714; German Patent No. 27,22,140, or German Published Application No. 36 38 286.

For example, the outer electrodes can be obtained by firing a paste that is principally composed of nickel and is mixed with a glazing compound. The ceramic body formed in this way is then introduced into a pressure vessel and is dipped into molten lead which serves as the conducting material for the capacitor coatings, the temperature of the melt being about 330° to 360° C. Subsequently, the pressure is elevated to about 10 bar so that molten lead penetrates into the cavities of the ceramic body under pressure, passing exclusively through the porous, outer electrodes. The ceramic body is then removed from the molten lead, cooled, and again exposed to normal pressure so that the inner electrodes of lead are formed. Following this, additional layers that are solderable are applied to the outer electrodes.

In order to manufacture the described multilayer capacitor, the outer electrodes applied to the monolithic ceramic body must be porous and must be fashioned or manufactured such that entry of the molten lead is initially possible for the inside electrodes but, on the other hand, they prevent the lead from flowing out of the cavities of the ceramic body when it is removed from the molten lead. As explained in U.S. Pat. No. 4,071,880, in column 10, lines 51 through 58, the metal melt should not easily wet the ceramic body. In other words, the porous outer electrodes form penetration barriers in certain conditions. The porous, outer electrodes are principally composed of nickel that does not react with lead. The adhesion to the end faces of the ceramic body depends on the amount of glazing compound within the paste, the adhesion being improved with an increasing amount of glazing compound. In this case, however, the number of pores in the outer electrode is diminished so that the penetration of the lead is rendered more difficult, whereas glass components block the intermediate layers and deteriorate the delivery of lead. The electrostatic capacitance can therefore not be set in a desired way, even when the ceramic module is exposed to a relatively high pressure within the melt.

In order to overcome the problems described, U.S. Pat. No. 4,658,328 which corresponds to German Published Application No. 36 12 084 has proposed that the cavities in the interior of the ceramic body be designed such that they are open both to end faces which lie opposite one another as well as, to a slight degree, toward the adjoining lateral surfaces so that the molten metal in the injection process can penetrate not only through the porous contact layers but also can penetrate through the lateral surfaces that are open to a slight degree and through parts of the cavities that are free of contact layers, and can nevertheless not flow out from the cavities again.

U.S. Pat. No. 4,658,238 also discloses a method which comprises the above recited method steps for the manufacture of the capacitor, but with the requirement that the contact layers applied to the end faces continue to be porous.

German Published Application Nos. 36 27 936 which corresponds to U.S. Ser. No. 086,520, filed Aug. 18, 1987, and 36 27 928 disclose multilayer capacitors comprising a sintered, monolithic ceramic body and disclose methods for the manufacture thereof which likewise comprise the features of the previously described multilayer capacitors and the methods for their manufacture. In contrast with the metal or metal alloys heretofore proposed for these purposes, these applications propose the use of a metal which wets the surface parts inside the cavities of the ceramic body. A series of proposals that are also valid for the metal or metal alloys suitable for the present invention are made regarding these metals or alloys.

According to these applications, pressing the metals into the ceramic bodies continues to occur through the openings of the cavities that are directed toward only one side and can either still be free of a contact or be covered by a porous contact layer. In the former case, the contact layers are subsequently applied.

The use of a metal which wets the surface of the ceramic body well has the advantage that the metal no longer flows out of the cavities of the ceramic body when it is removed from the metal melt and a good bonding of the capacitor coatings to the contacts is guaranteed.

When the easily melting metal alloys are pressed through porous contact layers into the cavities of the ceramic body, the cavities being open only toward one side, the problems that have already been set forth appear, namely, the risk of blocking the pores in the porous layer and thus the risk of an inadequate filling of the cavities. These problems are incapable of being eliminated even when employing better wetting metals or metal alloys. The problems again arise when applying the contacts following the impression of the metal melt and cooling of the filled ceramic bodies, these problems being concerned with the bonding of the capacitor coatings in the inside of the ceramic body to the contacts at the end faces being inadequate.

Ceramic PTC resistors in the format of layers are disclosed, for example, by British Patent No. 932 558 and ceramic multilayer varistors are disclosed, for example, in U.S. Pat. No. 4,675,644 which corresponds to European Patent Application No. 0 189 087.

SUMMARY OF THE INVENTION

The present invention provides an electrical multilayer component and a method for the manufacture thereof which assures, first, a complete filling of the cavities in the ceramic body and a good bonding, i.e., a connection between the coatings in the inside of the ceramic body and the contact layers, and, second, a substantial simplification of the manufacturing method.

In order to achieve this objective, the electrical multilayer component of the present invention has the following features:

the cavities are open to the lateral surface over their entire length;

the metal fillers are composed of a metal or alloy having the property of wetting the surfaces of the ceramic layers in the cavities in the molten condition;

spaces free of metal are present at lateral faces in the cavitites due to the contraction of the cooled metal of the metal filler;

the contact layers at the end faces are not porous.

Various alloys can preferably be used for the metal filler, for example, a lead-indium alloy having an indium constituent equal to or greater than 0.5% by weight, preferably 2.5 to 20% by weight. In addition, a lead-silver-indium alloy having at least 0.5% by weight indium and a total of up to 20% by weight of silver and indium can be used, together with copper-indium or silver-indium alloys.

The contact material is preferably composed of nickel or alloys having a high nickel concentration or of silver or alloys having a high silver concentration.

The contacts are preferably applied by printing (silk screening), dipping, chemical deposition, electrodeposition, by cathode sputtering, by vapor-deposition, or by metal spraying.

If necessary, it is advantageous that the regions of the lateral surfaces which are free from the contacts are covered with electrically insulating and moisture-tight material such as a plastic, as disclosed in U.S. Pat. No. 4,658,328 or German Published Application No. 36 12 084.

The method for manufacturing the electrical multilayer component of the present invention involves:

(a) forming ceramic layers of about 0.03 to 0.1 mm thickness whose width and length each amounts to a multiple of the width and length of the ceramic body to be produced from a suspension that contains dielectric or semiconducting material in finely distributed form, followed by drying;

(b) a suspension in the thickness of about 0.005 to 0.02 mm is applied, as by printing, on these layers in the form of limited areas having a defined arrangement and is dried. The suspension contains constituents such as oxides, carbonates, carbon or lamp black which volatize during the later sintering stage together with ceramic particles that remain essentially unaltered during the later sintering;

(c) a stack is formed from a plurality of such layers, the suspension regions in the stack overlapping in large sub-regions, the stack being provided with suspension layers at the top and bottom which serve as cover layers, and are free of the suspension regions;

(d) the stack is compressed and is divided along sectional lines in the longitudinal direction and in the transverse direction, either subsequently or after the sintering;

(e) the compressed stack of individual bodies is sintered at a temperature of 1000° C. or above with appropriate heating and cooling schedules;

(f) contact layers, in particular, of nickel or silver that are non-porous and thus impervious to the melt are applied by chemical deposition or electrodeposition, by printing, by dipping methods, by cathode sputtering, by vapor-deposition, or by metal spraying;

(g) the ceramic bodies provided with the contacts are dipped into a metal melt in an autoclave, the molten metal wetting the surfaces of the ceramic layers in the cavities exclusively through the cavities of the ceramic body that are open at the lateral surfaces. The ceramic body and the molten metal are subjected to superatmospheric pressures for pressing the metal into the cavities and are then cooled with a subsequent reduction of the pressure to normal pressure.

The suspension is preferably applied in the form of strips which represent the limited regions and which extend over the full width of the layers.

The following advantages have been achieved by the present invention. It has been found that the employment of metals or metal alloys which wet the surfaces in the cavities of the ceramic layers lead to edge regions at the lateral surfaces which are free of metal due to contraction of the metal. An adequate insulation between the individual, metal coatings at the lateral surface is guaranteed. The contraction of the metal does not occur at the locations at which the metal has combined with the metal of the contact applied before the pressure application. In order to increase the insulation, the free surface portions of the lateral surfaces or even the entire multilayer capacitor can be provided with an envelope of known insulating material. Metal which may be present at undesired locations can be chemically or mechanically removed in a simple way.

Furthermore, the filling paths become shorter because the metal to be introduced penetrates into the ceramic body proceeding from the lateral surfaces. The filling with metal is also accomplished in a shorter time. When manufacturing the ceramic bodies, it is no longer necessary to produce limited spots of the suspension for the porous intermediate layer on the individual suspension layers. Instead, regions of suspension material in strip form for the porous intermediate layer can be applied extending over the full width of the suspension layers. As a result, it is also possible to sinter not only the discrete parts but even larger stacks can be sintered and divided into individual ceramic bodies after the sintering because the decomposition and escape of the porous intermediate layer components can also emerge out of this larger stack. As a result of the shorter paths, shorten saturation times and lower pressures are used in the impregnation, and a lower stress on the ceramic bodies also results. The application of the contact layers before the injection of the metal melt prevents the individual ceramic bodies from bonding together or even fusing together in every stage of the process, particularly when the layers are composed of nickel.

The invention is preferably directed to multilayer capacitors but also can be employed for PTC resistors or varistors.

The expression "ceramic particles are contained distributed in the volume of the cavity" includes both individual particles that serve as supporting elements as well as a porous matrix whose pores are interconnected to one another across the entire volume, so that the impressed, molten metal can penetrate completely in any case.

The ceramic material used in accordance with the invention has dielectric or semiconducting properties. Such material may include, for example, ferroelectrics, dielectric materials having a perovskite structure, for example, titanates of alkaline earths particularly of barium or mixed titanates as well as titanates substituted by other alkaline earths or magnesium and/or wherein the titanium is substituted, for example, by tin. A dielectric material having perovskite structure can be doped with additives such as antimony, bismuth or lanthanum or rare earth metals or also with copper or iron, so that higher values of the dielectric constant or improved PTC properties result or so that other electrical properties such as the temperature dependency or the loss factors can be varied in accordance with desired requirements. The invention is also applicable to known materials for varistors, i.e., resistors whose value of resistance is dependent on the applied voltage and that are also referred to as voltage dependent resistors, and contain zinc oxide as their principal constituent.

BRIEF DESCRIPTION OF THE DRAWINGS

The invention will be set forth in greater detail with reference to an exemplary embodiment of a multilayer capacitor shown in the attached figures.

FIG. 1 illustrates a monolithic ceramic body before the application of the contacts and before the cavities are filled with metal;

FIG. 2 shows a finished multilayer capacitor in a front elevational view;

FIG. 3 is a cross-sectional view taken substantially along the line III—III in FIG. 2;

DESCRIPTION OF THE PREFERRED EMBODIMENTS

Figure 4:
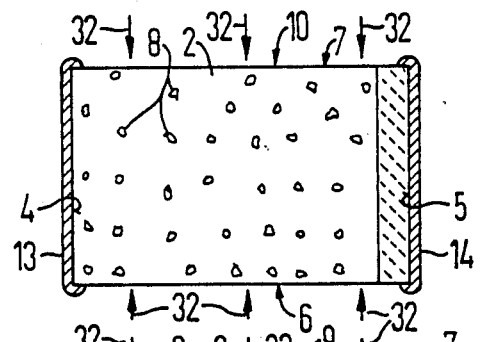
FIG. 4 is a cross-sectional view taken substantially along the line IV—IV in FIG. 1.
Figure 5:
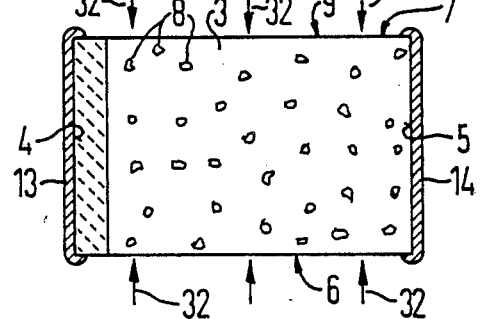
FIG. 5 is a cross-sectional view taken substantially along line V—V in FIG. 1.
Figure 6:
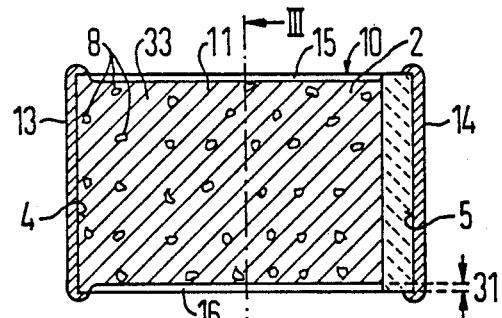
FIG. 6 is a cross-sectional view taken substantially along the line VI—VI in FIG. 2.
Figure 7:
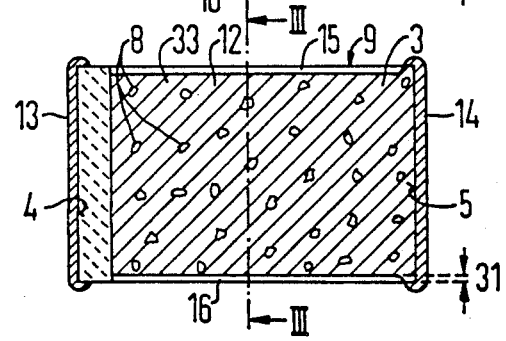
FIG. 7 is a cross-sectional view taken substantially along the line VII—VII in FIG. 2.

FIG. 1 shows a sintered, monolithic ceramic body 1 which is provided with cavities 2, 3. The cavities 2 are open toward an end face 4 and the cavities 3 are open toward an end face 5 at the opposite end of the ceramic body 1. Both cavities, however, are open entirely toward opposed lateral surfaces 6 and 7. Ceramic particles 8 are distributed within the cavities 2 and 3 and serve as supporting elements. The monolithic ceramic body is sintered together with the use of ceramic layers 9 and 10 serving as the dielectric.

FIG. 1 shows the ceramic body in its condition following sintering but before the application of the contact elements to the end faces 4 and 5 and before the filling of the cavities 2 and 3 with the relatively low melting metal.

FIG. 2 shows a finished multilayer capacitor in a front elevational view. The monolithic ceramic body 1 consisting of sintered together ceramic layers 9 and 10 whose cavities 2, 3 filled with the metal fillers 11 and 12. Alternating from layer to layer, these metal filters 11 and 12 terminate at end faces 4 and 5 which lie opposite one another and are electrically connected to one another by means of the contact elements 13 and 14.

As shown in U.S. Pat. Nos. 3,679,950 and 4,071,880, the contact elements 13 and 14 can cover only the end faces. These contact elements are solderable themselves or include a further, solderable layer to which, for example, power leads can be soldered.

It is also possible and advantageous in many instances to have the contact elements 13 and 14 not only at the end faces 4 and 5 but also extending around partially on to the lateral surfaces 6 and 7. For example, this is advantageous in what are referred to as chip components because these can then be directly soldered on to a circuit board provided with printed interconnects.

In this case, the contact elements 13 and 14 extend around on to the adjoining lateral surfaces 6 and 7 to such an extent that a seating surface having a width 28 results. This width is to be dimensioned such that it is adapted to the surfaces to which the chip capacitor is to be soldered.

The distance 29 between the end of the contact elements 13 and 14 and the ends of the metal fillers 11 and 12 at the opposite potential must thereby be at least as great as the distance 30 between the metal fillers 11 and 12 in order to guarantee the necessary insulation spacings.

In FIG. 3, there are shown spaces 15 and 16 free of metal which are present at the lateral surfaces 6 or 7, the spaces 15 or 16 increasing the insulation between two metal fillers 11 and 12 in that the depth 31 of these spaces 15 and 16 free of metal is added to the thickness 30 between the two metal fillers 11 and 12.

FIGS. 4, 5, 6 and 7 show cross sections along the lines IV—IV and V—V in FIG. 1 and also VI—VI and VII—VII in FIG. 2 to schematically explain the process of introducing the low melting, wetting metal.

The molten metal is introduced into the cavities 2 and 3 in the direction shown by the arrows 32. The cavities 2 and 3 which have been filled with metal which has already solidified may be seen in FIGS. 6 and 7, the spaces 15 and 16 comprising the dimension 31 and being free of metal, due to the contraction of the solidifying metal.

Figure 8:
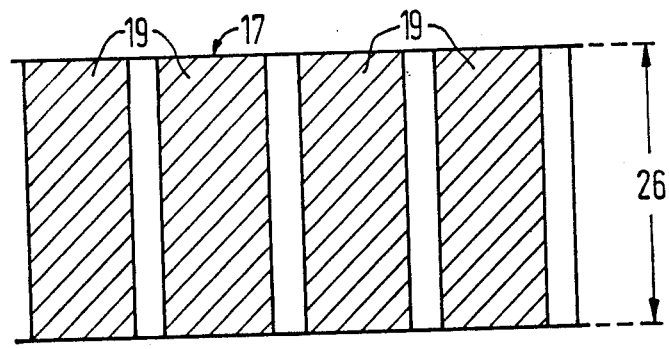
FIG. 8 illustrates a suspension layer with applied suspension strips in a plan view.
Figure 9:
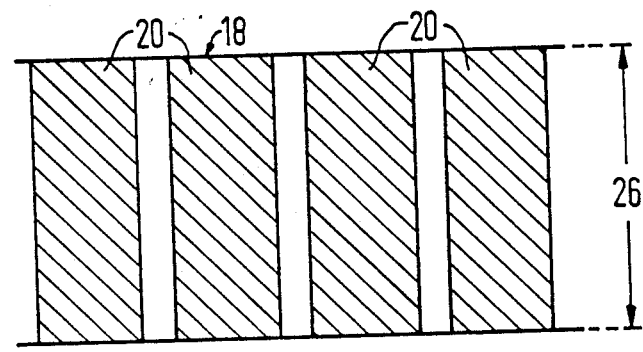
FIG. 9 illustrates a further suspension layer with applied suspension strips in a plan view.
Figure 10:
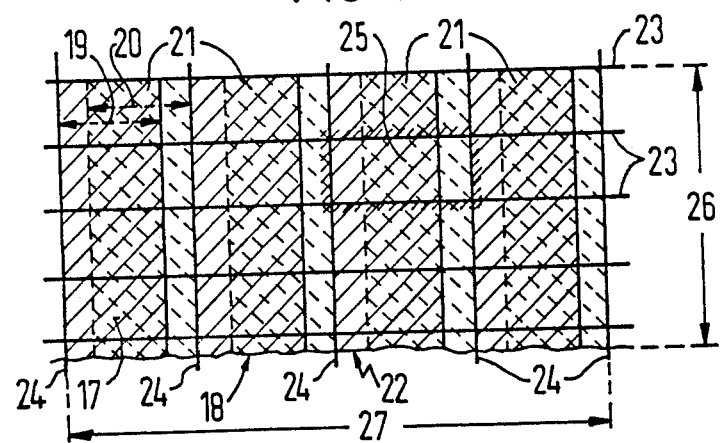
FIG. 10 is a schematic view of a stack formed of a plurality of suspension layers having applied suspension strips.

FIGS. 8, 9, and 10 illustrate the method for the manufacture of the sintered, monolithic ceramic body 1 up to a certain stage in the process.

Layers 17 and 18 are formed from a suspension of ceramic particles and form the ceramic layers 9 and 10. The manufacture of such suspension layers is adequately known. Pre-sintered materials in powder form are used for this purpose, these materials forming the dielectric layers in the sintered condition and having suspension agents which volatilize during the later heating or sintering process. The layers 17 and 18 are provided with strips 19 and 20 over their full width 26. The manufacture of such a suspension and the manner of applying it to the suspension layers 17 or 18 are likewise adequately known, for example, from the above described patents. A plurality of suspension layers 17 or 18 prepared in such a way are placed together to form a stack 22 such that the suspension strips 19 or 20 overlap in a relatively large sub-region 21 as shown in FIG. 10. This stack 22 is consolidated by applying pressure and, preferably, heat and is subjected to sintering in this form. It is then divided along the cutting lines 23 and 24 into discrete bodies 25 which are shown with shaded edges in FIG. 10. Alternatively, the division may occur along the cutting lines 23 and 24 for the formation of the discrete bodies 25 first followed by the sintering with an appropriate heating and cooling program.

As may be clearly seen from FIG. 10, the width 26 and the length 27 of the suspension layers 17 and 18 are greater than the width and length of the ultimately resulting individual body 25.

It will be evident that various modifications can be made to the described embodiments without departing from the scope of the present invention.

I claim as my invention:

1. A multilayer electrical component comprising:
   a sintered, monolithic ceramic body composed of layers having cavities provided between alternating layers, said cavities being open to opposed end faces of said body in alternating fashion and also be open along their entire widths to lateral faces perpendicular to said opposed end faces,
   ceramic particles dispersed in said cavities serving as supporting elements between adjacent ceramic layers,
   said cavities having metallic filler deposits therein composed of a metallic composition which wets the ceramic body and which melts at a temperature substantially lower than the sintering temperature of said ceramic body, said filler terminating short of the marginal edges of said layers due to contraction of the metallic filler during solidification in said cavities, and
   non-porous electrical contacts closing off said opposed end faces and providing electrical connection between alternating filler deposits.

2. An electrical component according to claim 1 wherein said metal filler is composed of a lead-indium alloy having at least 0.5% indium by weight.

3. An electrical component according to claim 2 wherein said indium content is in the range from 2.5 to 20% by weight.

4. An electrical component according to claim 1 wherein said metal filler is composed of a lead-silverindium alloy containing at least 0.5% by weight indium and a total of up to 20% by weight of silver and indium.

5. An electrical component according to claim 1 wherein said metal filler is composed of a copper-indium alloy.

6. An electrical component according to claim 1 wherein said metal filler is composed of a silver-indium alloy.

7. An electrical component according to claim 1 wherein said contacts are composed of a metal composition consisting at least predominately of nickel.

8. An electrical component according to claim 1 wherein said contacts are composed of a metal composition consisting at least predominately of silver.

9. An electrical component according to claim 1 wherein the portions of the periphery of said component not covered by said contact are covered with an electrically insulating moisture barrier.

10. A method for the manufacture of a multilayer electrical component comprising:
   depositing ceramic particles into continuous layers each of which has a width and length constituting a multiple of the width and length of the finished component,
   depositing a suspension of ceramic particles and particles which are liberated when exposed to a ceramic sintering temperature in spaced areas along said continuous layers,
   stacking a plurality of said continuous layers such that the suspensions on said layers substantially overlap,
   compressing the stack to consolidate the same,
   sintering the consolidated stack,
   applying non-porous contacts over end faces of the consolidated stack,
   injecting molten metal which wets the ceramic into the resulting structure while said structure and said molten metal are both under superatmospheric pressure,
   reducing said pressure to atmospheric pressure, and cooling the metal impregnated stack.

11. A method according to claim 10 wherein said contacts are applied by chemical deposition, by electroplating, by printing, by dipping, by vapor-deposition, or by metal spraying.

12. A method according to claim 10 wherein said spaced areas consist of stripes which extend the full width of said continuous layers.

* * * * *